(12) United States Patent
Stewart et al.

(10) Patent No.: US 7,155,673 B2
(45) Date of Patent: Dec. 26, 2006

(54) SYSTEM AND METHOD OF INTERACTIVE EVALUATION OF A GEOMETRIC MODEL

(75) Inventors: Paul Joseph Stewart, Ann Arbor, MI (US); Pietro Buttolo, Dearborn, MI (US); Yifan Chen, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 542 days.

(21) Appl. No.: 09/775,368

(22) Filed: Feb. 1, 2001

(65) Prior Publication Data

US 2002/0101400 A1 Aug. 1, 2002

(51) Int. Cl.
*G06F 3/00* (2006.01)
*G06F 9/00* (2006.01)
*G06F 17/00* (2006.01)
*G09G 5/00* (2006.01)

(52) U.S. Cl. .................................... 715/701; 345/156
(58) Field of Classification Search ........ 345/156–179, 345/700–702; 715/701
See application file for complete search history.

(56) References Cited

U.S. PATENT DOCUMENTS

| | | | |
|---|---|---|---|
| 4,821,214 A | 4/1989 | Sederberg | |
| 5,119,309 A | 6/1992 | Cavendish et al. | |
| 5,179,644 A | 1/1993 | Chiyokura et al. | |
| 5,253,331 A | 10/1993 | Lorenzen et al. | |
| 5,459,382 A | 10/1995 | Jacobus et al. | |
| 5,504,845 A | 4/1996 | Vecchione | |
| 5,625,576 A | 4/1997 | Massie et al. | |
| 5,629,594 A | 5/1997 | Jacobus et al. | |
| 5,694,013 A | 12/1997 | Stewart et al. | |
| 5,731,816 A | 3/1998 | Stewart et al. | |
| 5,739,811 A | 4/1998 | Rosenberg et al. | |
| 5,802,353 A | 9/1998 | Avila et al. | |
| 5,831,408 A | 11/1998 | Jacobus et al. | |
| 5,844,392 A | 12/1998 | Peurach et al. | |
| 5,903,458 A | 5/1999 | Stewart et al. | |
| 5,999,187 A | 12/1999 | Dehmlow et al. | |
| 6,036,345 A | 3/2000 | Jannette et al. | |
| 6,084,587 A | 7/2000 | Tarr et al. | |
| 6,084,590 A | 7/2000 | Robotham et al. | |
| 6,104,158 A | 8/2000 | Jacobus et al. | |

(Continued)

OTHER PUBLICATIONS

Duane et al., "DOE/Opt: A System for Design of Experiments, Response Surface Modeling and Optimization Using Process and Device Simulation" 1993. p. 1-4.

(Continued)

*Primary Examiner*—Sumati Lefkowitz
*Assistant Examiner*—Srilakshmi K Kumar
(74) *Attorney, Agent, or Firm*—David B. Kelley; Bliss McGlynn

(57) ABSTRACT

A system and method of interactive evaluation of a geometric model is provided. The method includes the steps of acquiring a haptic device position and orientation with respect to a surface of the geometric model and mapping the haptic device position and orientation into a geometric model coordinate reference system. The method also includes the steps of determining a closest point position and orientation on the surface of the geometric model to the haptic device position and extracting a surface property at the closest point position and orientation. The method further includes the steps of determining a stick-to-surface force and a property feedback force using the surface property at the closet point position and orientation and applying the stick-to-surface force and property feedback force to control a location and force output of the haptic device.

20 Claims, 2 Drawing Sheets

U.S. PATENT DOCUMENTS

| | | | |
|---|---|---|---|
| 6,111,577 | A | 8/2000 | Zilles et al. |
| 6,262,738 | B1 | 7/2001 | Gibson et al. |
| 6,831,640 | B1 * | 12/2004 | Shih et al. .................. 345/419 |
| 2002/0133264 | A1 | 9/2002 | Maiteh et al. |
| 2002/0163497 | A1 | 11/2002 | Cunningham et al. |

OTHER PUBLICATIONS

Chen et al., "A Real-Time, Interactive Method for Fast Modification of Large-Scale CAE mesh Models" 2000. p. 1-8.

Chen et al. IMF 1.0 User Manual Project No. AJ499 Ford Research Laboratory Oct. 26, 1999. p. 1-14.

Smid et al., "Human Integration in Simulation" IEEE 1998 pp. 554-558.

Narinder Nayar, DENEB/ERGO—A Simulation-Based Human Factors Tool, 1995, Proceedings of the Winter Simulation Conference, pp. 427-431.

Deidre L. Donald, A Tutorial on Ergonomic and Process Modeling Using Quest and IGRIP, 1998, Proceedings of the 1998 Winter Simulation Conference, pp. 297-302.

P.J. Stewart, "Direct Shape Control of Free-Form Curves and Surfaces with Generalized Basis Functions", PhD Dissertation, University of Michigan, 1991, pp. 1-237.

Kalra et al,. "Real-Time Animation of Realistic Virtual Humans", Sep./Oct. 1998, IEEE, pp. 42-56.

Nobel et al., "Direct Manipulation of Surfaces Using NURBS-Based Free-Form Deformations", 1999, IEEE, pp. 238-243.

Juran on Quality by Design, by J.M. Juran, The Free Press, 1992, ISBN 0-02-916683-7, pp. 406-427, and 462-467.

RAMSIS—The Human Touch to Technology, p. 1-3 http://www.human-solutions.com/prudukkte_ramsis_e.php.

Purschke-F et al. : Vlurtual Reality-New Methods for Improving and Accelerating the Development Process in Vehicle Styling and Design IEEE document via Computer Graphics International Jun. 1998, p. 1-11.

* cited by examiner

SYSTEM AND METHOD OF INTERACTIVE EVALUATION OF A GEOMETRIC MODEL

BACKGROUND OF THE INVENTION

1. Field of the Invention

The present invention relates generally to computer-assisted design of vehicles and, more specifically, to a system and method of interactive evaluation of a geometric model in the computer-assisted design of a vehicle.

2. Description of the Related Art

Vehicle design, and in particular the design of an automotive vehicle, has advanced to a state in which computer assisted design techniques are frequently incorporated in the development of a new vehicle, or redesign of an existing vehicle. Enhanced visualization software tools allow for interactive display and manipulation of large geometric models, including models developed using computer aided design (CAD). In the field of vehicle design, the use of computer aided design and visualization techniques are especially beneficial in designing, packaging, and assembling the various systems incorporated within the vehicle, to maximize the design and functional capabilities of these vehicles. Advantageously, potential vehicle system designs can be considered in a timely and cost-effective manner by analyzing a digital representation of a proposed design, versus preparing an actual vehicle model.

One aspect of the design task for a vehicle is the coexistence of a CAD generated geometric model and a physical model. An advantage of the physical model is that it provides a physical representation of the design that can be evaluated visually and by touch. For example, a clay model allows a designer to assess a surface quality of the model through multi-fingered, two handed, dexterous manipulation of the model. Designers often trace the contour of a vehicle surface with their fingertips and palm, to obtain tactile information to assess surface fairness. A disadvantage of the physical model relates to transforming the physical model back into the original CAD format after the designer has modified the physical model.

The geometric model of a proposed design is constructed using a technique such as computer-aided design (CAD). An advantage of a CAD model is that known mathematical tools, such as computer-aided engineering (CAE), are available to constrain and guide the designer in evaluating the design. Also, the construction steps involved in creating the geometric model can be recorded for later use. The geometric model can easily be updated using the construction steps in light of a new set of parameters. A disadvantage of a CAD model relates to viewing a 3-dimensional model in 2-dimensions on a display device.

Recently, designers have utilized virtual reality simulation techniques to provide a bridge between the physical model and the CAD model. Virtual reality allows a user to interact with a virtual environment, including a virtual object in the virtual environment, as if the user was actually immersed in the virtual environment. It should be appreciated that a virtual object within the virtual environment may include a virtual surface.

A user-friendly physical device, such as a haptic device, serves as an interface between the user and the virtual environment. Advantageously, the haptic device reproduces at a high rate of speed the sensation of freely moving an object within a constrained environment by determining the forces exchanged between the interacting geometries. This process is frequently referred to as haptic rendering. An example of a haptic interface is disclosed in U.S. Pat. No. 5,694,013 to Stewart et al., entitled "Force Feedback Haptic Interface for a Three-Dimensional CAD Surface", the disclosure of which is incorporated by reference.

Haptic rendering provides the user with information regarding the virtual surface using force feedback from a single point of contact. In particular, haptic browsing refers to the tactile interaction and visualization of the geometric surface using a haptic interface. An example of a methodology of haptic browsing is disclosed in U.S. Pat. No. 5,844,392 to Peurach et al., entitled "Haptic Browsing", the disclosure of which is incorporated by reference. While the method disclosed by Peurach et al. '392 uses haptics to present information regarding a single point, it does not constrain the haptic interface to the surface of the geometric model to convey kinesthetic or tactile information. Thus, there is a need in the art for a system and method of interactive evaluation of a geometric model using a haptic interface constrained to a virtual surface within the virtual environment, in order to assess a geometric property associated with the virtual surface.

SUMMARY OF THE INVENTION

Accordingly, the present invention is a system and method of interactive evaluation of a geometric model. The system includes a computer system having a memory, a processor, a user input device and a display device. The system also includes a computer generated geometric model stored in the memory of the computer system. The system further includes a haptic interface operatively in communication with the computer system, wherein the haptic interface includes a haptic device for transmitting information between a user and the geometric model.

The method includes the steps of acquiring a haptic device position and orientation with respect to a surface of the geometric model and mapping the haptic device position and orientation into a geometric model coordinate reference system. The method also includes the steps of determining a closest point position and orientation on the surface of the geometric model to the haptic device position and extracting a surface property at the closest point position and orientation. The method further includes the steps of determining a stick-to-surface force and a property feedback force using the surface property at the closet point position and orientation and applying the stick-to-surface force and property feedback force to control a location and force output of the haptic device.

One advantage of the present invention is that a system and method of interactive evaluation of a geometric model is provided that constrains a user's motion to stick to a surface of a geometric model within a virtual environment. Another advantage of the present invention is that a system and method is provided for haptically browsing the surface of the virtual model, thus allowing the user to assess a physical property of a surface, such as smoothness or fairness. Still another advantage of the present invention is that a system and method is provided that bridges between the physical model and the CAD model by allowing the user to touch the CAD model using virtual reality technology. Still yet another advantage of the present invention is that the system and method integrates tactile feedback in a force enabled simulation to constrain physical interaction of the user to the virtual model. A further advantage of the present invention is that the motion of the user is constrained to the virtual surface representing the geometric model, to provide the user with an enhanced understanding of the geometric properties of the model.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 5 is a diagrammatic view of a haptic device position and orientation for a geometric model, according to the present invention.

DESCRIPTION OF THE PREFERRED EMBODIMENT(S)

Vehicle design is achieved according to the present invention with a generic, parametric driven design process. Advantageously, this process allows for flexibility in vehicle design and engineering analysis of the design in a fraction of the time required using conventional design methods. Various computer-based tools are integrated to achieve this enormous time and expense savings, including solid modeling, parametric design, and automated studies.

Figure 1:
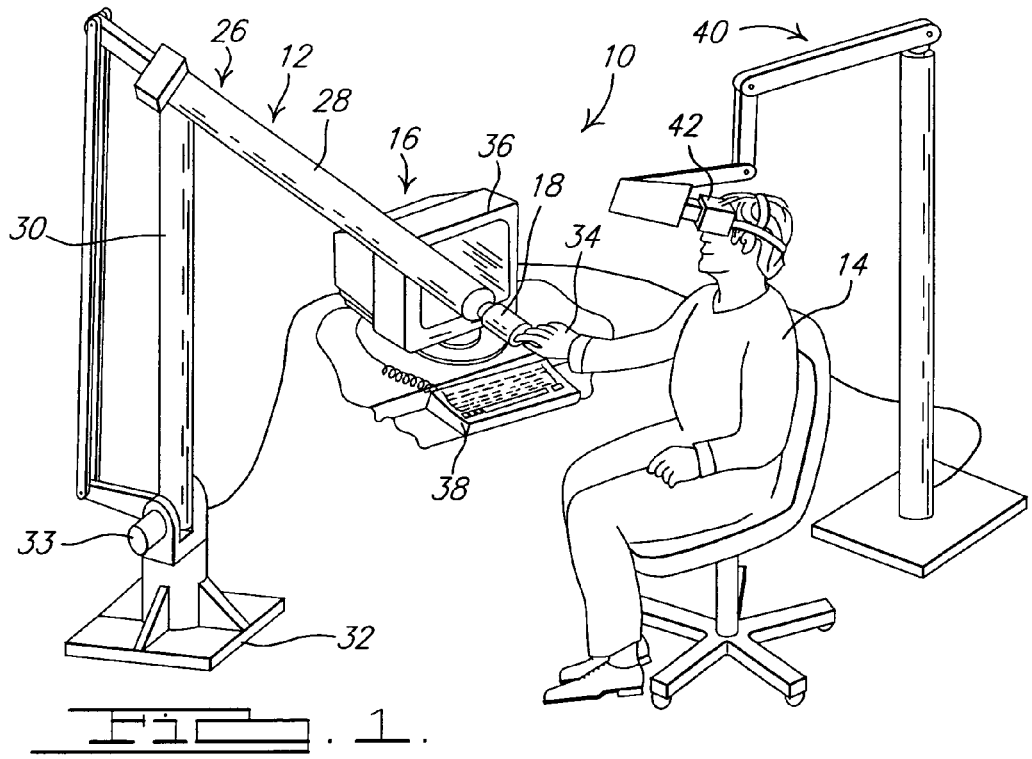
FIG. 1 is a diagrammatic view of a system of interactive evaluation of a geometric model, according to the present invention.
Figure 2:
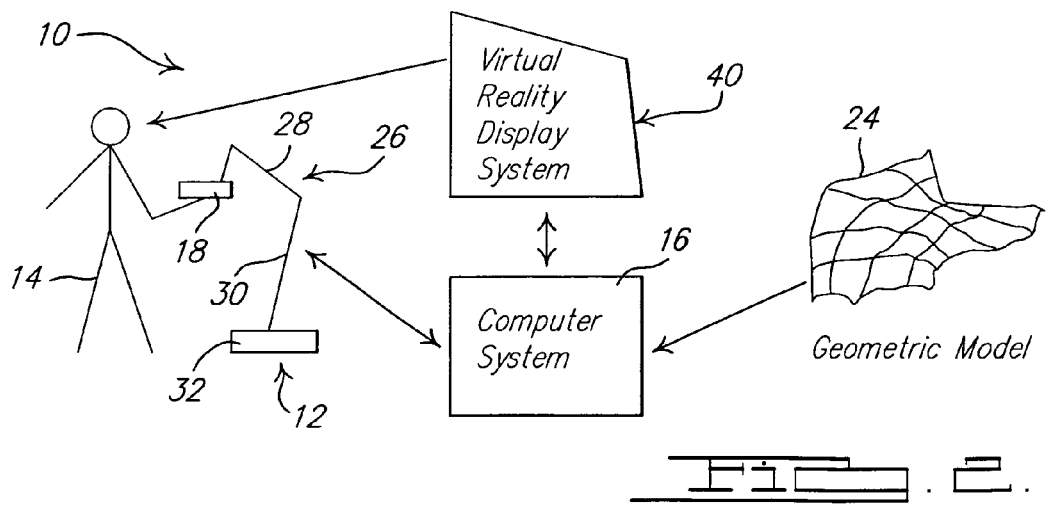
FIG. 2 is a block diagram of the system of interactive evaluation of a geometric model, of FIG. 1.
Figure 3:
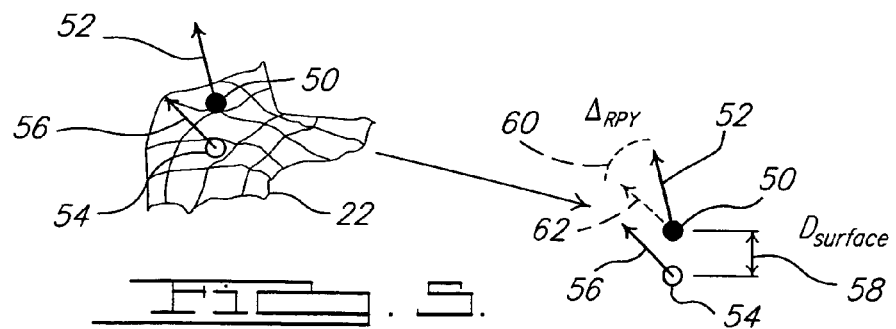
FIG. 3 is a perspective view of a haptic interface browsing a virtual surface, according to the present invention.
Figure 3:
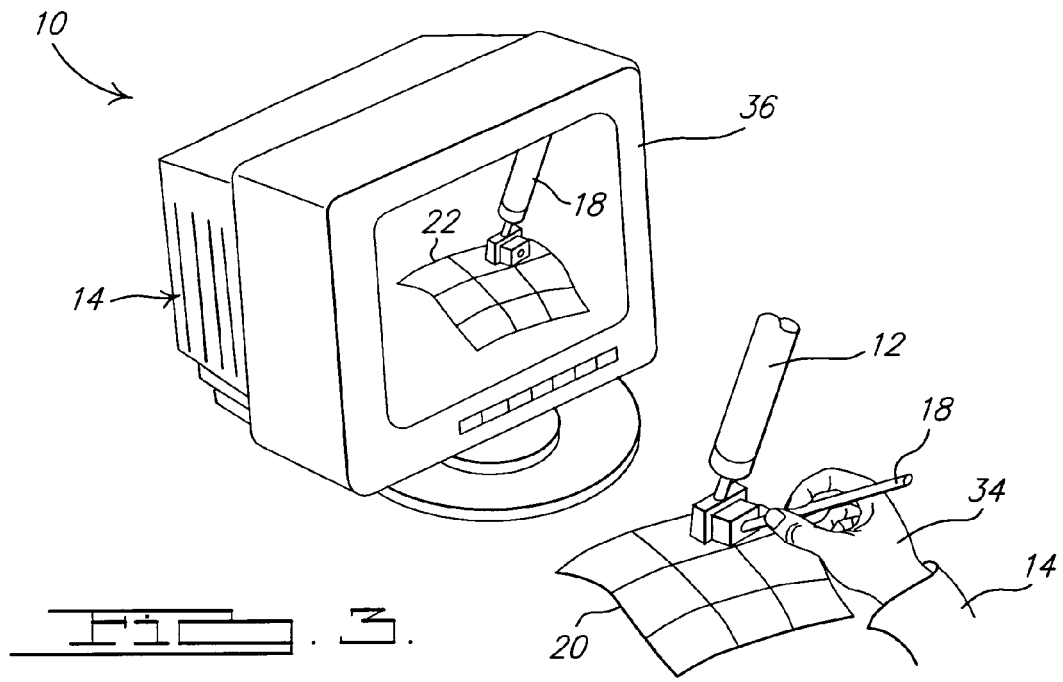

Referring to the drawings and in particular to FIGS. 1 through 3, a system 10 for interactive evaluation of a geometric model, according to the present invention, is illustrated graphically. The system 10 includes a haptic interface 12 operated by a user 14 that controls position, orientation, and force feedback between the user 14, a computer system 16, and a virtual object. It should be appreciated that the virtual object is a geometric model representing the design form of a physical model. In this example, the computer generated geometric model represents a design form for a vehicle (not shown). The vehicle design is typically generated through the use of conventional computer aided design (CAD), including computer aided manufacturing (CAM) and computer aided engineering (CAE) techniques.

The haptic interface 12 includes a haptic end effector device 18, such as a stylus, pen, or any other similar gripping device. The haptic end effector device 18 is grasped by the user 14 and translates information regarding a surface of the geometric model, such as sensations of rigidity and facial roughness.

In this example, an active force is applied to the haptic end effector device 18, to constrain the user's hand onto a virtual surface 20 representing a surface of the geometric model, shown at 22. Preferably, the haptic interface 12 includes at least three degrees of freedom, in order to interact with three-dimensional objects. In addition, if the haptic interface 12 has six degrees of freedom, a torque can also be applied to constrain the haptic end effector device 18, and the user's hand orientation, to follow a curvature of the surface 20. By forcing the haptic end effector device 18 to stick to the surface 20 representing the geometric model 24, the user 14 receives tactile information for assessing a quality of the geometric design. In particular, if the haptic end effector device 18 is constrained to be normal to the surface 20, it allows for an evaluation of geometric properties including curvature changes, discontinuities, irregularities, smoothness and fairness. In automotive vehicle styling, for example, the haptic end effector device 18, in conjunction with the method of interactive evaluation, to be described, enables the user 14 to touch, feel, and edit complex three-dimensional CAD geometry.

The haptic interface 12 also includes a hingeable arm 26. In this example, the hingeable arm 26 includes an upper arm 28 and a lower arm 30. The haptic end effector device 18 is attached to the upper arm 28. The lower arm 30 is attached to a base 32. The haptic interface 12 is operatively connected to an actuating device 33, such as a servo I/O interface, or other similar device capable of transmitting forces to the end effector through the arms in at least three degrees of freedom. Information regarding an interaction with the object is transmitted through the haptic end effector device 18 and the arm 26 to the computer system 16. For example, the haptic end effector device 18 provides a physical connection between a hand 34 of the user 14 and a computer model shown at 22, constraining the user's motion to always be on the surface. In addition, the user 14 can tap on a portion of the computer model 22. In this example, the computer model 22 is a three-dimensional computer-aided design of a vehicle, or a portion thereof. Advantageously, the haptic interface 12 provides an interface between a real world and a virtual world.

The system 10 further includes a computer system 16, as is known in the art, operatively connected to the haptic interface 12. The computer system 16 includes a processor, a controller, and a memory to process information relevant to the method of interactive evaluation of a geometric model. The computer system 16 includes a display device 36, such as a video terminal, to display the computer aided vehicle design.

The user 14 inputs information into the computer system 16 when prompted to do so. Selection and control of the information within a screen can be achieved by the user 14 via a user interactive device 38, such as a keyboard. The set of parameters or the set of instructions may be specific to the method of interactive evaluation of a geometric model, wherein other data and information non-specific to the method may already be stored in the memory of the computer system 16. One example of an input method is a pop-up dialog box containing available information or instructions. For example, information may be representative of different vehicle design alternatives. The computer system 16 utilizes the set of information or instructions from the user 14 and any other information in carrying out a method, according to the present invention and discussed in detail subsequently, of interactive evaluation of a geometric model.

The system 10 also include a virtual reality display system 40. Preferably, the virtual reality display system 40 includes a head mounted display device 42, as is known in the art. The virtual reality display device 42 is worn by the user 14 and allows the user 14 to "see" a virtual environment. The virtual reality display system 40 is in communication with the computer system 16, and provides the user 14 a view through a virtual human's eyes, or a first person view of the virtual environment. For example, the position of the haptic end effector device 18 is measured, mapped into a reference frame of the mathematical model and visually rendered on either the display device 36 or the head mounted display device 42 or another type of graphical display device 42, as is known in the art. Advantageously, the system 10 can be utilized to evaluate a vehicle design based on various factors, such as assembly verification, and ergonomics, early in the design process.

In operation, the controller sends the computer system 16 a signal representing a joint position for the joints between the haptic end effector device 18, upper arm 28, lower arm 30 and base 32, respectively. The computer system 16 sends force signals to the controller, which controls the servo I/O interface 33 to generate the necessary forces applied by the haptic end effector device 18. The user 14 can view the geometric model 24, such as on the display device 36 or in the head mounted display device 14. The user 14 manipulates the haptic end effector device 18 to "track" along a surface of the geometric model 24. The method of the present invention constrains the motion of the haptic end effector device 18 to stick to the virtual surface 22 of the geometric model 24, to enable the user 14 to explore and feel the geometric model 24. Advantageously, this is a time and cost savings as compared to performing the same evaluation using a physical prototype.

Advantageously, the computer-implemented method of interactive evaluation of a geometric model combines all of the foregoing to provide an efficient, flexible, rapid tool for evaluating the design of a vehicle. Furthermore, information obtained during the subjective evaluation of the design is an output of the method and is available for further analysis and study.

Figure 4:
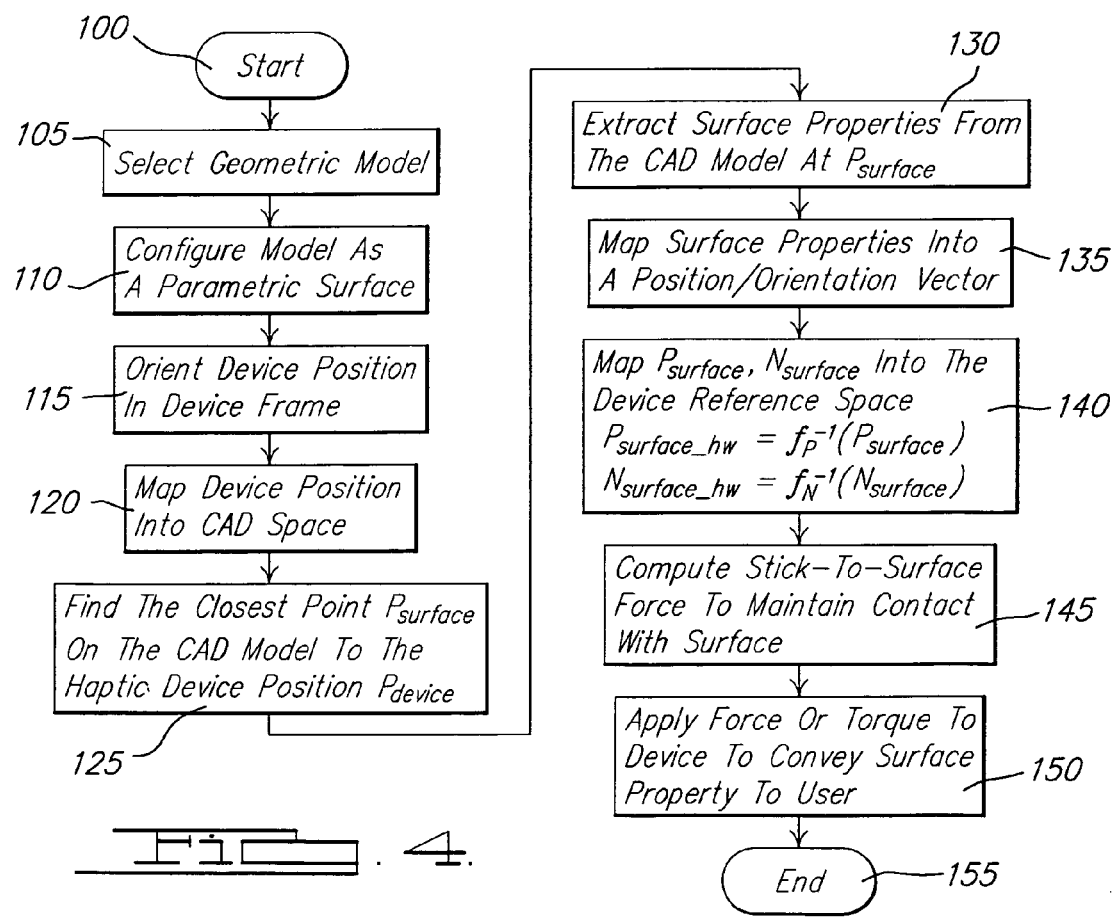
FIG. 4 is a flowchart of a method of interactive evaluation of a geometric model, according to the present invention.

Referring to FIG. 4, a method, according to the present invention, of interactive evaluation of a geometric model is illustrated. Advantageously, the methodology provides the user 14 with tactile and visual information directly from the computer model. The user 14 holds the haptic end effector device 18, and the motion of the haptic end effector device 18 is constrained to the surface 22 of the geometric model 24, and oriented normal to the surface 22. The user 14 can apply the methodology for assessing the smoothness, fairness or other geometric property of the surface 22. The method begins in block 100 and continues to block 105.

In block 105, the user 14 selects a geometric model 24 for assessing its geometric properties, and the model 24 is imported into the methodology. Preferably, the geometric model 24 is a computer generated, computer-aided design (CAD) model, digital buck or other mathematical or geometric representation, and is maintained in a computer database. The geometric model 24 is represented using a known data format, such as a set of NURBS, a three-dimensional solid CSG or a polygonal soup. In this example, the geometric model 24 represents a vehicle, and in particular a portion of a body of the vehicle. Further, the user 14 may select a surface 22 representing a section of the geometric model 24 to evaluate, such as by drawing a box (not shown) around the desired section of the geometric model 24 to evaluate using a user interactive device 38 such as a mouse. It should be appreciated that the drawing process includes a click, drag and release of the mouse, as is known in the art. The methodology advances to block 110.

In block 110, the methodology configures the geometric model 24 as a parametric surface, so that each point representing the model 24 is uniquely identified by a set of coordinates within a known coordinate system. An example of a parametric surface is a NURBS surface, other surface representations like a tessellated mesh can be parametrized such as that described in U.S. Pat. No. 5,903,458 to Stewart et al., entitled "System and Method for Forming Geometric Features Using Global Reparametrization". In addition, a computer program such as SDRC I-DEAS is commercially available for configuring a CAD model as a parametric surface. The methodology advances to block 115.

In block 115, the methodology determines a haptic end effector device position within a haptic end effector device coordinate system reference frame, for use in determining the haptic end effector device position and orientation. Preferably, a workspace reference frame, origin (0,0,0) and scale of the geometric model 24 is established, so that the reference frames of the haptic end effector device 18 and geometric model 24 are coordinated. The haptic end effector device position $P_{hardware}$ represents the physical position of the haptic end effector device 18, and the orientation of the haptic end effector device 18 is represented by a normal to the surface of the geometric model 24, referred to as $N_{hardware}$. Preferably, the haptic end effector device position is established using a tracking technique, as is known in the art. The methodology advances to block 120.

In block 120, the methodology maps the haptic end effector device position $P_{hardware}$ and orientation $N_{hardware}$ into the geometric model reference system, which in the example is a CAD model. For example, the haptic end effector device position is mathematically derived by multiplying a predetermined factor $f_p$ by the haptic device position $P_{hardware}$ as follows:

$$P_{device} = f_p(P_{hardware}).$$

The orientation of the haptic end effector device 18 is similarly mapped into the CAD space using:

$$N_{device} = f_N(N_{hardware}).$$

$P_{device}$ and $N_{device}$ represent the new position and orientation of the haptic device 18 mapped into the reference system for the CAD model. As illustrated in FIG. 5, the haptic end effector device position $P_{device}$ shown at 50 and orientation $N_{device}$ shown at 52 are mapped into the surface of the CAD model 20. The methodology advances to block 125.

In block 125, the methodology finds a closest point $P_{surface}$ and orientation $P_{surface}$ on the CAD model, to the haptic end effector device position, $P_{device}$. As illustrated in FIG. 5, $P_{surface}$ and $P_{surface}$ are shown at 54 and 56, respectively. An example of a mapping technique is disclosed in U.S. Pat. No. 5,694,013 entitled "Force Feedback Haptic Interface for a Three-Dimensional CAD Surface", the disclosures of which is hereby incorporated by reference. The methodology advances to block 130.

In block 130, the methodology extracts surface properties of the CAD model at the closest point position $P_{surface}$ and orientation $N_{surface}$. An example of a surface property is surface normal $SN_{surface}$, or a curvature value $Sk_{surface}$. The surface properties can be computed using known techniques. For example, an analytical technique is used if the geometric representation is the true description of the geometric model 24, such as with a NURBS surface. Alternatively, the surface properties can be computed by interpolation or shading if the geometric representation is, by way of example, a polygonal tessellation or a volumetric approximation. The methodology advances to block 135.

In block 135, the methodology maps the surface properties of the closest point position $P_{surface}$ and orientation $P_{surface}$ into a position or orientation vector. Advantageously, the reference frame of the position or orientation vector is generic, in order to map from one physical domain into another. For example:

$$P_{surface} = f_{sp}(SK_{surface})$$

$$P_{surface} = f_{SN}(SP_{surface})$$

The methodology advances to block 140.

In block 140, the methodology maps the point $P_{surface}$ and orientation $N_{surface}$ surface properties into the haptic end effector device reference system space from the position or orientation vector. For example:

$$P_{surface\_hw} = f_p^{-1}(P_{surface})$$

$$N_{surface\_hw} = f_n^{-1}(N_{surface})$$

The methodology advances to block 145.

In block 145, the methodology computes a force feedback representing a stick-to-surface force, and a property-feedback force. Advantageously, the properties of the surface are tactilely conveyed to the user 14 by constraining the haptic end effector device 18 to the surface 20. In this manner, the user 14 can feel the surface properties. The orientation of the haptic end effector device 18 is used to provide the user 14 with feedback as to what properties are changing on the surface 22 of the model 24. The stick-to-surface force conveys the attraction of the haptic end effector device 18 to the surface 20 of the model 24. Also, the stick-to-surface force maintains the orientation of the haptic end effector device 18 parallel to the normal of the surface 20, and the haptic end effector device 18 in contact with the surface 20. For example, the mathematical relationship $P_{surface\_hw} - P_{hardware}$ is used to control the force output of the haptic end effector device 18 to constrain the tip of the pen to the surface using:

$$F_{stick} = f_{stick}(P_{surface\_hw} - P_{hardware}).$$

The property-feedback force represents a torque applied to a tip of the haptic end effector device 18, to constrain the orientation of the haptic end effector device 18 to match the selected surface property to the user 14. For example, the mathematical relationship $P_{surface\_hw} - N_{hardware}$ is used to control the force output to convey surface properties to the user using:

$$F_{sp} = f_{sp}(P_{surface_{hw}} - N_{hardware}).$$

The methodology advances to block 150. In block 150, the stick-to-surface force, $F_{stick}$ and property feedback force, $F_{sp}$, are added together and applied to the haptic end effector device 18. Advantageously, the user's hand 34 is constrained to the virtual surface 20 as he/she browses the surface 20 using the haptic end effector device 18. The user 14 receives tactile and visual stimulation directly from the computer model 24. Geometric properties such as curvature changes, discontinuities, irregularities, smoothness and fairness are conveyed to the user 14, that could previously only be conveyed via a physical prototype.

Preferably, $P_{surface}$ and $P_{surface}$ are used as reference values to control the location and/or force output of the haptic end effector device 18. For example, the distance $D_{surface}$ between $P_{surface}$ and $P_{hardware}$ shown at 58 in FIG. 5, and the angular displacement $\Delta_{rpy}$ shown at 60 in FIG. 5 are determined. The angular displacement $\Delta_{rpy}$ is the difference between $P_{surface}$ and $N_{hardware}$, expressed in Roll-Pitch-Yaw (RPY) angles, as is understood in the art. The orientation of the haptic device is also expressed in RPY.

Next, it is determined whether $D_{surface}$ and $\Delta_{rpy}$ are less then threshold vectors $D_{thrsla}$ and $\Delta_{thrsld}$, respectively. A torque vector as shown at 62 is applied at the haptic end effector device actuators 33 that will produce an equivalent force or torque at the haptic end effector device 18, that is proportional to $D_{surface}$ and $\Delta_{rpy}$, and orientated along their respective vectors. It should be appreciated that if the haptic end effector device 18 is a predetermined distance from a target position and orientation of the surface, an incrementally decreasing force is applied to the haptic end effector device 18, to maintain the stability of the system 10 and avoid the application of an excessively large force to the user 14.

The methodology advances to block 155 and ends. It should be appreciated that the methodology is executable in an iterative manner, for the user 14 browsing the surface 22 of the geometric model 24. It should also be appreciated that a parallel process operating on the computer system 16 may periodically display the geometric model 24 and a simplified representation of the haptic end effector device 18 onto the 2-dimensional display device 36, or the head mounted display mechanism 42.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system of interactive evaluation of a geometric model comprising:
   a computer system including a memory, a processor, a user input device, and a display device;
   a computer generated geometric model stored in said memory of said computer system; and
   a haptic interface operatively in communication with said computer system, wherein said haptic interface includes a haptic device for transmitting information between a user and the geometric model and wherein a haptic device position and orientation are acquired with respect to a surface of said geometric model and mapped into a geometric model coordinate reference system, a closest point position and orientation on the surface of said geometric model to the haptic device position is determined, a surface property of said geometric model at the closest point position and orientation is extracted, and a stick-to-surface force and a property-feedback force are determined and applied to said haptic device to constrain a motion of said haptic device to stick and be orientated normal to a virtual surface representing the surface of said geometric model, thereby constraining a hand of a user to always be on the surface to enable the user to explore and feel the geometric model.

2. A system as set forth in claim 1 including a virtual reality display mechanism operatively in communication with said computer system and said haptic interface, so the user can see the geometric model in a virtual environment.

3. A system as set forth in claim 1 wherein said haptic interface tactilely conveys a surface property of the geometric model to a user through said haptic device and said haptic device is constrained to the surface of the geometric model.

4. A method of interactive evaluation of a geometric model, said method comprising the steps of:
   acquiring a haptic device position and orientation with respect to a surface of the geometric model, wherein the haptic device is operatively connected to a haptic interface and the geometric model is stored in a memory of a computer system;

mapping the haptic device position and orientation into a geometric model coordinate reference system;

determining a closest point position and orientation on the surface of the geometric model to the haptic device position;

extracting a surface property at the closest point position and orientation;

determining a stick-to-surface force and a property feedback force using the surface property of the geometric model at the closet point position and orientation; and applying the stick-to-surface force and property feedback force to the haptic device to constrain a motion of the haptic device to stick and be orientated normal to a virtual surface representing the surface of the geometric model, thereby constraining a hand of a user to always be on the surface to enable the user to explore and feel the geometric model.

5. A method as set forth in claim 4 including the step of selecting a geometric model from a database in the memory of the computer system prior to said step of acquiring the haptic device position and orientation, wherein the geometric model is a computer-aided design model.

6. A method as set for in claim 5 including the step of configuring the geometric model as a parametric surface, wherein a point representing the model has a set of coordinates within a predetermined coordinate system.

7. A method as set forth in claim 6 including the step of orienting a haptic device position within a haptic device coordinate system.

8. A method as set forth in claim 4 wherein said step of extracting a surface property includes the step of determining a surface normal at the closest point position and orientation.

9. A method as set forth in claim 4 wherein said step of extracting a surface property includes the step of determining a surface curvature at the closest point position and orientation.

10. A method as set forth in claim 4 including the step of mapping the surface property of the closest point position and orientation into a vector after said step of extracting a surface property.

11. A method as set forth in claim 10 including the step of mapping the surface property of the closest point position and orientation into the haptic device coordinate reference system.

12. A method as set forth in claim 4 wherein said step of applying a stick-to-surface force and a property feedback force includes the step of tactilely conveying a surface property of the geometric model to a user through the haptic device and constraining the haptic device to the surface of the geometric model.

13. A method as set forth in claim 4 wherein the user views the surface of the geometric model using a virtual reality display mechanism in communication with the computer system and the haptic interface.

14. A method as set forth in claim 13 wherein the computer system, haptic interface and virtual reality display mechanism are in communication with each other.

15. A method of interactive evaluation of a geometric model, said method comprising the steps of:

selecting a geometric model from a database in the memory of a computer system;

acquiring a haptic device position and orientation with respect to a surface of the geometric model, wherein the haptic device is operatively connected to a haptic interface;

mapping the haptic device position and orientation into a geometric model coordinate reference system;

determining a closest point position and orientation on the surface of the geometric model to the haptic device position;

extracting a surface property at the closest point position and orientation;

mapping the surface property of the closest point position and orientation into a vector;

mapping the surface property of the closest point position and orientation into the haptic device coordinate reference system;

determining a stick-to-surface force and a property feedback force using the surface property of the geometric model at the closet point position and orientation; and adding the stick-to-surface force and property feedback force together to form an applied force and applying the applied force to the haptic device to constrain a motion of the haptic device to stick and be orientated normal to a virtual surface representing the surface of the geometric model, thereby constraining a hand of a user to always be on the surface to enable the user to explore and feel the geometric model.

16. A method as set forth in claim 15 including the step of configuring the geometric model as a parametric surface, wherein a point representing the model has a set of coordinates within a predetermined coordinate system.

17. A method as set forth in claim 16 including the step of orienting a haptic device position within a haptic device coordinate system.

18. A method as set forth in claim 15 wherein said step of extracting a surface property includes the step of determining a surface normal at the closest point position and orientation.

19. A method as set forth in claim 15 wherein said step of extracting a surface property includes the step of determining a surface curvature at the closest point position and orientation.

20. A method as set forth in claim 15 wherein the user views the surface of the geometric model using a virtual reality display mechanism in communication with the computer system and the haptic interface.

* * * * *